May 28, 1963

T. BOWEN 3,091,126

ADJUSTABLE CLOCKWORK DRIVEN MECHANISM FOR MOVING AN
ACTUATING MEMBER AT PRE-SELECTED TIMES FROM ONE
LIMIT OF MOVEMENT TO ANOTHER

Filed Jan. 19, 1960

May 28, 1963 T. BOWEN 3,091,126
ADJUSTABLE CLOCKWORK DRIVEN MECHANISM FOR MOVING AN
ACTUATING MEMBER AT PRE-SELECTED TIMES FROM ONE
LIMIT OF MOVEMENT TO ANOTHER
Filed Jan. 19, 1960 6 Sheets-Sheet 2

May 28, 1963 T. BOWEN 3,091,126
ADJUSTABLE CLOCKWORK DRIVEN MECHANISM FOR MOVING AN
ACTUATING MEMBER AT PRE-SELECTED TIMES FROM ONE
LIMIT OF MOVEMENT TO ANOTHER
Filed Jan. 19, 1960 6 Sheets-Sheet 5

Tom Bowen
by Moore & Hall
attys.

May 28, 1963

T. BOWEN 3,091,126

ADJUSTABLE CLOCKWORK DRIVEN MECHANISM FOR MOVING AN
ACTUATING MEMBER AT PRE-SELECTED TIMES FROM ONE
LIMIT OF MOVEMENT TO ANOTHER

Filed Jan. 19, 1960

Tom Bowen
by Moore & Hall
Attys.

United States Patent Office 3,091,126
Patented May 28, 1963

3,091,126
ADJUSTABLE CLOCKWORK DRIVEN MECHANISM FOR MOVING AN ACTUATING MEMBER AT PRE-SELECTED TIMES FROM ONE LIMIT OF MOVEMENT TO ANOTHER
Tom Bowen, Hove, England, assignor, by mesne assignments, to S. Smith & Sons (England) Ltd., London, England, a corporation of England
Filed Jan. 19, 1960, Ser. No. 3,339
Claims priority, application Great Britain Jan. 21, 1959
27 Claims. (Cl. 74—3.54)

This invention relates to adjustable clockwork driven mechanism for moving an actuating member at preselected times from one limit of movement to another. The words "clockwork driven mechanism" are intended to include only constant speed power driven mechanism, for example, a spring motor embodying an escapement mechanism or a synchronous electric motor energised by a frequency controlled alternating power means. The invention is particularly applicable to the case in which the actuating member is arranged to condition means for turning on a gas burner of a cooker at a predetermined time and also to condition means for turning the burner off after a preselected cooking time.

According to one aspect of the invention an adjustable clockwork driven mechanism for moving an actuating member at pre-selected times from one limit of movement to another comprises first and second cams both rotated by clockwork through a transmission which permits relative rotational adjustment between them, both cams having slots or depressions in their operative faces, cam followers associated with the cams and mounted on carriers which are brought into and out of engagement with one another by the action of the cams on the followers, one of which followers or its carrier is engageable with said actuating member and when moving in one direction moves said actuating member against the action of a spring, and a main spring associated with the followers or their carriers so that when both followers are opposite the cut-outs or depressions in their cams the two carriers are brought together and the two springs are so conditioned that the resulting action on the actuating member is to move it in one direction whereas when one of their followers only is opposite a cut-out in its cam the resulting action on the actuating member is to move it in the opposite direction.

According to another aspect of the invention an adjustable clockwork driven mechanism for moving an actuating member at pre-selected times from one limit of movement to another comprises two cams both rotatable by the clockwork through a transmission which permits relative rotational adjustment between them, cam followers associated with said cams and arranged to move said actuating member at said pre-selected times, one of which cams may be driven under the direct control of a manual setting member and the other connected directly to part of the clockwork mechanism and which setting member is linked to the clockwork mechanism and its associated cam both by a lost motion connection and by a yielding coupling.

In this latter arrangement said cam followers are mounted on carriers which are brought into and out of engagement with one another by the action of the cams on the followers, one of which followers or its carrier is engageable with said actuating member and when moving in one direction moves said actuating member against the action of a spring, and a main spring associated with the followers or their carriers so that when both followers are opposite the cut-outs or depressions in their cams the two carriers are brought together and the two springs are so conditioned that the resulting action on the actuating member is to move it in one direction whereas when one of the followers only is opposite a cut-out in its cam the resulting action on the actuating member is to move it in the opposite direction.

In either of these arrangements said main spring is connected between the followers or their carriers and is arranged to urge the followers towards their cams, and the other spring operates upon said actuating member or upon the follower associated therewith in opposition to the first said spring means, the two springs being so arranged that should the cams be in positions where both followers are opposite the slots or depressions in their cams, the follower associated with the second cam is forced by the effects of the two spring means into the slot or depression in its cam while the other follower remains out of or only partly enters the slot in the first cam, whereby the actuating member is located at one limit of its movement whereas should the cams be in such positions that the follower associated with the second cam is not opposite the slot or depression in its cam but the other follower associated with the first cam is opposite the slot or depression in that cam the dual effect of the two spring means is to move the latter follower into the slot or depression thereby bringing the actuating member to the other limit of its movement.

Preferably a part moving with the second follower is arranged to engage the first follower or part moving therewith when the second follower enters the slot or depression in its associated cam and ensures that the second spring means may move the first follower out of the slot or depression in its associated cam.

In an alternative arrangement said main spring is connected at one end to a fixed anchorage and at the other end to a follower or its carrier so as to urge that carrier toward the other carrier which controls the actuating member whereby when both followers are opposite the cut-outs or depressions in their cams the main spring overcomes the action of the other spring and moves both carriers and the actuating member in one direction whereas when the first said follower moves onto a surface of the cam away from the cut-out therein and the other follower is opposite the cut-out in its cam, both carriers are moved away from the other spring which causes the actuating member to be moved by the other spring in the opposite direction.

In either of the arrangements referred to above the two cams may be coaxially arranged and said slots or depressions are formed in their peripheral faces.

The slot or depression in one of the cams may have a cut-away or depression of an angular extent corresponding to the maximum time during which the actuating member may be required to be maintained at one limit of its movement.

The cut-away or depression in the other cam is preferably of such a size and shape that upon entry of the follower into it, under the action of said main spring, the rotations of the cams and clockwork are arrested.

It will be appreciated with the above arrangements that by adjusting the positions of the slots or depressions in the cams relatively to one another and to fixed parts of the apparatus there may be pre-selected the time when the actuating member is moved to one limit of its movement, the time during which it remains in that position and is then moved back to the other limit.

The transmission for driving the two cams may provide for a greater speed of rotation for the cam which controls the duration time during which the actuating member is retained at one limit of its movement than for the other cam.

In either of the alternative arrangements the cam followers are disposed on opposite sides of the two coaxially arranged cams and are mounted respectively on two lever arms pivoted together at a distance away from the axis of rotation of the cams so that the pivot axis lies in a plane extending substantially midway between the followers and containing the axes of the cams and the main spring tends to move one arm towards the other.

In such an arrangement means may be provided for limiting the movement of the two lever arms towards one another. For example, they may be provided with abutting faces.

The first said spring means may be incorporated in the mechanism to be controlled by the actuating member. For example, in the case where the adjustable clockwork mechanism is arranged to control the opening and closing of a valve, the first said spring means may comprise a spring acting upon one side of a movable valve member the opposite side of which valve member is engaged by said actuating member or by a member between said actuating member and the valve member.

In any of the arrangements referred to above the transmission for driving the two cams may comprise an arbor rotated by a main spring which arbor is geared to an escapement mechanism and also has fixed to it one of said cams and first and second pinions are rotatably mounted on the arbor, the first pinion being connected to said one cam and the second pinion being connected to the arbor by a rotatably adjustable coupling and which two pinions mesh respectively to two other pinions attached to a lay spindle mounted in a fixed bearing.

The gearing between the arbor and escapement mechanism preferably embodies a slip clutch.

The rotatably adjustable coupling between the second pinion and the arbor may comprise two coupling elements one of which is fixed to the arbor and the second yieldingly rotatably engages the first and the second coupling element is connected to the second pinion. The yielding rotatable engagement between the two coupling elements may comprise a spring pressed ball carried by that coupling element which is fixed to the arbor and which ball is engageable between teeth formed on the periphery of the second coupling element.

A tongue fixed to or formed on the second pinion may be arranged to engage a slot or the like in the toothed coupling element and which tongue may also be arranged to engage a part of the first coupling element when relative rotation is effected between the elements by means of a manipulating member on the second element.

An indicator may be provided one form of which comprises a circular time scale which is disposed around the axis of the arbor, and is secured to a fixed part of the apparatus, a pointer fixed to the arbor and traversing said time scale, a second pointer on a member rotatable about the axis of the arbor and yieldingly connected to the manipulating member and provided with an abutment or abutments engageable with two stops fixed respectively in relation to the manipulating member and a stationary part, which abutment or abutments and stops are so disposed that when the former are in engagement with the stops on their trailing sides, with respect to the direction of rotation of the arbor under the action of its spring one of the followers is in engagement with the slot in the first cam at the leading end thereof and the other follower is in the slot or depression in the second cam.

In an alternative arrangement a circular time scale is disposed around the axis of rotation of the arbor and is secured to a fixed part of the apparatus, a pointer fixed to the arbor and traversing said time scale, a second pointer on a member also rotatable about the axis of the arbor and yieldingly connected to said manipulating member, which member carrying the second pointer is formed with an arcuate slot through which projects a pin fixed to a part rotating with the manipulating member.

In either of these arrangements the yielding connection between the manipulating member and the first pointer may comprise a helical spring tending to move the pointers apart.

The second said pointer may be marked on a second disc at the leading end (with respect to the rotation of the arbor under the action of its spring) of an arcuate slot in the periphery of the disc and the first pointer is marked on a first disc so as to lie adjacent the second pointer when the followers are in their slots before the mechanism is set.

The first disc may be differently coloured on opposite sides of its pointer and the second disc may be similarly coloured to that part of the first disc which is on the leading side of its pointer.

The second disc may also be formed with a window beyond the trailing end of the arcuate slot on its periphery and the first disc is provided with a marking which appears in the window when the manipulating member is initially moved in a direction of rotation opposite for setting the time controlled mechanism.

The following is a description of two alternative forms of detachable clockwork driven mechanism for determining the time when a gas valve for a gas cooker is to be turned on, also the time when it is to be turned off, reference being made to the accompanying drawings in which.

A setting knob 1 is solidly connected to the toothed adjustable coupling element 2, the coupling element and knob being rotatable with respect to the main arbor 3. A conventional mainspring 118 has its inner end anchored to the arbor 3 and its outer end anchored to a fixed surrounding framework 119. The arbor 3 drives an escapement mechanism through a transmission comprising a gear wheel 120 fixed to the arbor and engaging a pinion 121 mounted on a spindle 122. One end of the spindle 122 is free to move in a short slot 123 so that the pinion 121 may ride out of engagement with the gear wheel 120 while the spring 118 is being wound by rotation of the arbor 3 clockwise. The spindle 122 is connected through a relatively stiff slip clutch 124 to a further gear 125 driving a conventional timing train a part of which is shown at 126 and associated with an escapement mechanism (not shown) to regulate the rate at which the arbor 3 rotates as the mainspring 118 runs down, drive to the train 126 being transmitted through the stiff slip clutch 124.

Figures 1, 2:
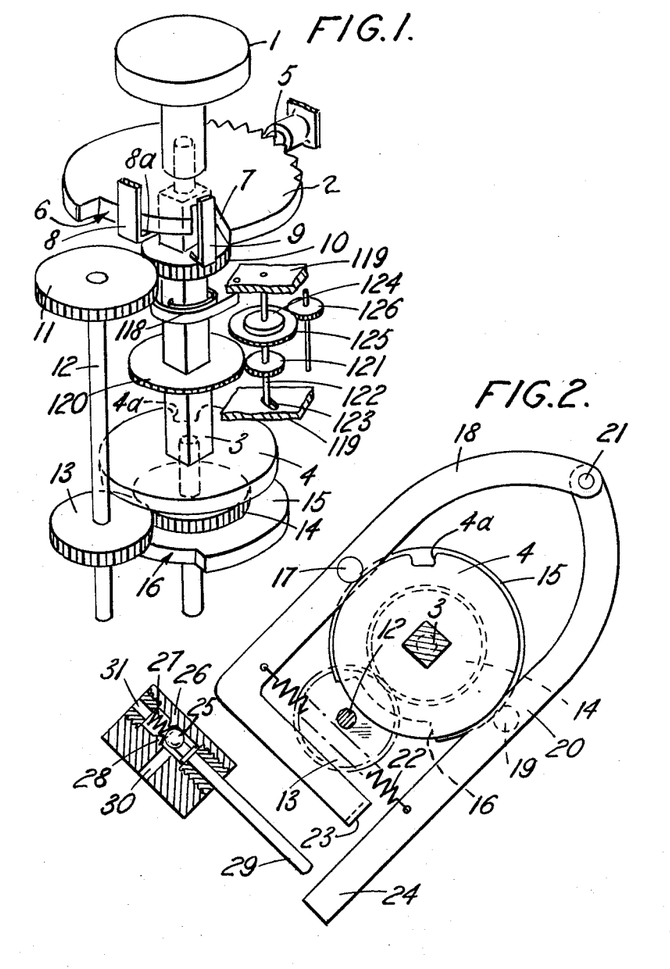
FIGURE 1 shows a perspective view showing the clockwork arbor and the adjustable transmission between it and the same but omitting the cam followers, setting mechanism and indicator.
FIGURE 2 is a cross-section through the lower part of FIGURE 1 and showing the cam followers and actuating member for a relay valve.

The arbor 3 has fixed to it a cam 4 (previously referred to as the second cam) which is generally circular except for a cut-out 4a, with edges rounded as may be seen in FIGURE 2.

The coupling element 2 is formed with a cut-out indicated at 6, extending over part of its periphery, this cut-out being deepened at one end as indicated at 7 to accommodate permanently a tongue 9. An arm 8a solidly connected to arbor 3, has a tongue 8 which extends into cut-out 6. There is thus provided a lost motion connection between the coupling element 2 and the arbor 3. The arm 8a also carries a spring loaded ball 5, which engages with the teeth formed on a part of the periphery of the coupling element 2. The arm 8a and spring pressed ball 5 constitute the other element of the coupling which can be relatively easily caused to yield thus varying the angular position of the element 2 relatively to the arbor 3. The tongue 9 which engages with the part 7 of cut-out 6, is solidly connected to a gear 10 which is freely rotatable on arbor 3. Gear 10 engages with a further gear 11 on a shaft 12 mounted in bearings (not shown) on a fixed part of the apparatus and has secured to it a further gear 13 engaging with a gear 14 solidly connected to a cam 15 (previously referred to as the first cam) and also freely rotatable with respect to arbor 3. Thus as the arbor 3 rotates under the action of the main spring 118 it transmits a drive directly to the cam 4 and through the couplings 8, 5, 2, the slot 7 and tongue 9 to gear wheel 10 and thence through the wheels 11, 13 and 14 to the cam 15. Gears 10, 11, 13 and 14 are such that the ratio of the transmission between gear 14 and gear 10 is less than one-to-one, i.e. a complete rotation of gear 10 corresponds to less than a complete rotation of gear 14. Thus the cam 15 is driven by the arbor 3 at a lesser speed than the cam 4. The cam 15 is formed with a cut-out 16, generally similar to cut-out 4a in cam 4 except that its angular extent is substantially greater.

Referring now to FIGURE 2 it will be seen that the cam 4 is associated with a follower in the form of a pin follower 17 mounted upon an arm 18 moving on a fixed pivot indicated at 21. Similarly the cam 15 co-operates with a pin follower 19 mounted on arm 20, arm 20 being likewise pivoted at 21. The arms 18 and 20 are joined by a tension spring 22 and arm 18 extends toward arm 20 and is provided with a down-turned tongue 23 which, when follower 19 is in cut-out 16 and follower 17 is on the circular part of the periphery of cam 4, the tongue 23 is just clear of arm 20, but when the followers 17 and 19 are respectively in cut-outs 4a and 16, the tongue 23 engages the arm 20 limiting the pivotal movement thereof about 21 under the action of spring 22.

The end part 24 of the arm 20 operates a plunger 29 constituting an actuating member for a pilot valve which controls a diaphragm-operated valve which in its turn controls the main gas supply for the cooker.

The pilot valve comprises a ball 25 in a housing 26 associated with a loading spring 27 which tends to lift it off a seat generally indicated at 28. The ball 25 is also engaged by a plunger 29 which acts to compress spring 27 when engaged by end portion 24 of arm 20. When the ball 25 is off its seat the pressures at the two ports 30 and 31 of the pilot valve are allowed to become equal. The ports 30 and 31 are connected to opposite sides of a diaphragm actuating a valve which controls the main supply of gas in known manner none of which is shown. When the ball 25 is off its seat, i.e. the pilot valve is open, the standard diaphragm valve cuts the main supply of gas off as shown in FIGURE 2.

However, if follower 19 is in cut-out 16 and follower 17 is on the circular part of cam 4, portion 24 of arm 20 engages plunger 29, and, under the influence of spring 22, thus overcoming spring 27, ball 25 is seated on seat 28 and the gas is turned on. However, when the follower 17 moves into cut-out 4a and 19 is opposite or partly in cut-out 16 (which condition prevails in the datum positions as hereinafter referred to) the tongue 23 engages portion 24, thus nullifying the action of spring 22 on the plunger 29, and the ball 25 is lifted off seat 28 by spring 27, and the main gas supply is turned off.

Figure 3:
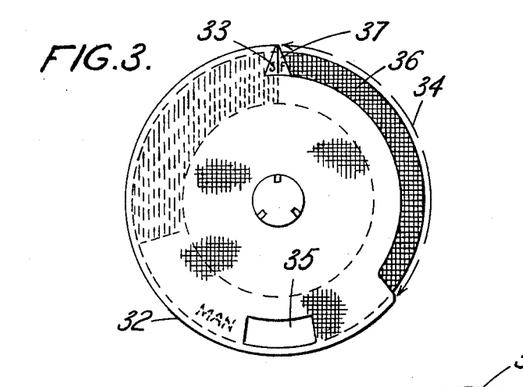
FIGURE 3 shows the superimposed indicating discs.
Figure 4:
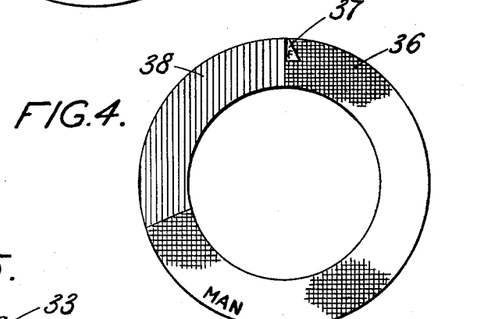
FIGURE 4 shows the lower disc driven by the arbor.
Figure 5:
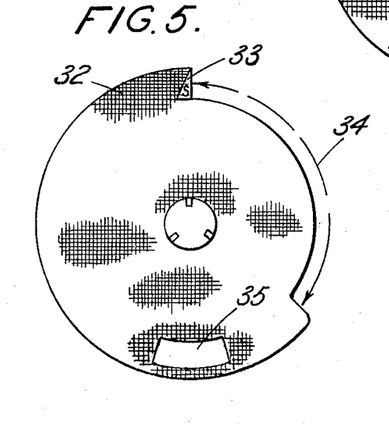
FIGURE 5 shows the upper disc which is yieldingly connected to the manipulating knob.

The relative positions of knob 1, arbor 3 and cam 4 and 15 are indicated by upper and lower discs shown in FIGURES 3 to 5.

An upper disc 32, shown in FIGURE 5 is attached to knob 1 by means of a light helical spring (not shown) tending to rotate it counter-clockwise with respect to knob 1 when viewed as in FIGURES 3 to 5. However, its counter-clockwise travel relative to knob 1 is limited by an abutment on the disc 32 engaging a first stop on the knob (not shown) and its counter-clockwise travel relative to the surrounding framework limited by the abutment on the disc engaging a second stop on the framework. The stops are so positioned that when knob 1 is in its datum position (see below) the abutments on the disc 32 are engaged by both stops on the knob 1 and frame respectively. Thus, when knob 1 is turned clockwise from its datum position the first stop on the knob engages the abutment on the disc 32 and the disc 32 traverses a time scale on the fixed frame and indicates the position of the knob 1 relatively to the frame, whereas when knob 1 is turned counter-clockwise from its datum position the second stop on the frame engages the abutment on the disc 32 which is then unaffected by the position of the knob 1. The disc 32 is generally annular in form, but has depicted on it a pointer 33 marked "S" (start) at one end of a cut-out indicated at 34. The extent of cut-out 34 corresponds to the maximum available cooking period. An aperture 35 is also formed in disc 32.

The lower disc 36 is annular in form and is attached to an extension of the tongue 8 and thus rotates with the arbor 3. It has depicted on it a pointer 37 marked "F" (finish) together with a red sector 38 which is exposed to view through cut-out 34 in disc 32. The disc 36 also carries the legend "MAN" (manual) which may be exposed through cut-out 35 in the disc 32.

When the pointers 33 and 37 are aligned i.e. as indicated on FIGURE 3 both are aligned with a datum mark (not shown) on a scale fixed to the frame calibrated in time and knob 1 is in its datum position follower 17 is in cut-out 4a and follower 19 is in cut-out 16 at its counter-clockwise end. Arm 8a is in engagement with the tongue 9 at the right-hand end of slot 6 and the clockwork is stationary. It will also be appreciated that the main gas supply is then off.

To set the timer from the datum position, knob 1 is turned clockwise carrying with it the toothed coupling element 2 and the tongue 9 which in the datum position is in contact with the arm 8a and thus the tongue 8 is pushed round clockwise and moves the arbor 3 and lower disc 36. Pointer 37 reads on the scale the desired time calculated from the actual time of the finish of the cooking operation.

This setting movement results in the cam 4 being rotated and the tongue 9 being connected to the gear 10 rotates the cam 15 through the gears 11, 13, 14 and the cams and followers 17 and 19 then assume positions as shown in FIGURE 2, and the main gas supply remains turned off. During this part of the setting operation the pinion 121 transmitting the drive from the main arbor 3 to the timing train ratchets out of engagement with its associated wheel 120, and the mainspring 118 is wound.

Knob 1 is then turned backwards counter-clockwise carrying with it the toothed element 2 and tongue 9 while leaving behind the tongue 8 and arbor 3 since the coupling element 2 is allowed to turn back around the arbor by the yielding of the spring loaded ball 5, but the arbor 3 and tongue 8 are held by the stiff slip clutch 124 in the main timing train. Knob 1 is turned back counter-clockwise until pointer 33 reads the desired time on the scale to the commencement of the cooking operation.

At this point followers 17 and 19 still remain in positions as shown in FIGURE 2 although the right-hand end of slot 16 will be nearer follower 19 unless an attempt is made to set the starting time before "zero" when 19 drops into 16 turning the main gas supply on. The exposed part of the red sector 38 then shows the duration of the cooking period. It will be appreciated that if an attempt is made to set a cooking period longer than that permitted by the timer i.e. the difference between the distance of 17 from the slots and the distance of 19 from slot 16 is greater than the length of the slot 16, engagement between the clockwise end of cut-out 6 and tongue 8 will result in the setting back of the finish time.

The arbor 3 then runs back (counter-clockwise) under the action of the mainspring, its rate of running being regulated by the escapement in the usual manner. During the running back period the connection between the toothed element 2 and arbor 3 via spring loaded ball 5 does not slip since there is no very substantial load transmitted through this connection.

As pointer 33 reaches the datum mark follower 19 drops into cut-out 16, turning the main gas supply on. Disc 32 is held by the stop, and gear 10 etc. continue to run backwards counter-clockwise.

As the cooking operation progresses the portion of red sector 38 exposed to view diminishes. When it is zero, pointers 33 and 37 become aligned and follower 17 drops into cut-out 4a and the main gas supply is turned off. The clockwork is stopped by engagement between 4a and 17.

To turn the gas supply on under manual control the knob 1 is turned counter-clockwise beyond its datum position. This brings the clockwise end (i.e., left hand end in FIGURE 1) of cut-out 6 into engagement with tongue 8. Follower 17 is forced out of cut-out 4a by reason of the rounded edges of the latter and the main gas supply is turned on due to the arm 24 being pulled against the plunger 29, the legend "MAN" becoming simultaneously visible through cut-out 35. Continued running of the clockwork is prevented by a stop (not shown) on the main arbor 3 coming into contact with a fixed abutment on the frame.

It will be appreciated that the gear ratio of less than 1 to 1 between gear 14 and gear 10 enables full utilisation to be made of one revolution of cam 4 without the follower 19 dropping into the counter-clockwise end of cut-out 16 when a maximum duration of "time to finish" is set.

It will be appreciated that the above arrangement is applicable to the control of an electrical switch as well as to a gas valve. However the desired snap action of the electric switch case would be achieved by further means additional to those shown and/or described.

In the alternative and preferred arrangement shown in FIGURES 6 to 14, there are again two settable cams 80 and 92 which may be differentially adjusted in respect to an arbor 40 of a clockwork mechanism by a setting member 42 through a lost motion connection 50, 54 and yielding coupling 55, 56 in a similar manner to the setting of the cams 4 and 15 of the first construction through the lost motion connection 9 and 8a and the yielding coupling 2 and 5.

The arbor 40 of a clockwork mechanism is rotatably mounted in a bearing in a hollow body part 41 which houses a spiral driving spring (not shown) connected at one end to the arbor and at the other end to the housing and which arbor drives a gear transmission one wheel of which is indicated at 9 and is the equivalent of the gear wheel 120 of the first construction and drives an escapement mechanism through a ratcheting gear wheel (not shown) and slip clutch similar to the gear wheel 121 and clutch 114 respectively of the first construction and operates in a similar manner to the first construction. The upper end of the arbor is encircled by a sleeve 42 which is provided at its upper end with a squared solid portion 43 and with a threaded extension 44. The sleeve is provided at its lower end with a flange 45 which is secured to a disc 46. The arbor has fixed to it beneath the disc 46 a circular plate 47 having two bracket arms 48 extending first radially outwards and then upwardly. Fixed beneath the plate 47 is an abutment piece 49 having a radially extending face 50. Rotatable on the arbor beneath the plate 47 and abutment piece is a pinion 51 having secured to it an outwardly and upwardly extending lug 52 which is permanently located in a slot 53 cut in the periphery of the disc 46. The outwardly extending portion 54 of the lug travels between the radial abutment face 50 of the abutment piece 49 and an edge of the right hand lug 48 (as seen in FIGURE 6).

Figure 8:
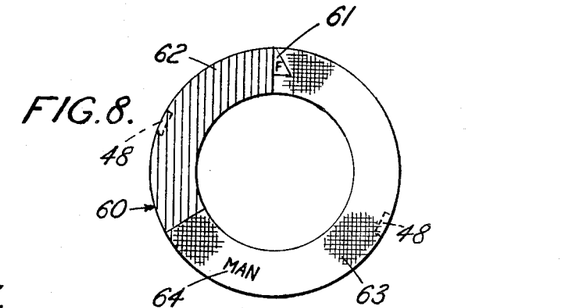
FIGURE 8 is a face view of the under indicating member shown in FIGURE 6.

The disc 46 has a number of teeth 55 cut in its periphery which may be engaged by a ball 56 in a socket 57 formed on an upwardly extending arm 58 fixed to the disc 47, and the ball is spring pressed inwardly by a blade spring 59 secured to yet another arm (not shown) fixed to the plate 47. The upper end of this arm and the left hand arm 48 have fixed to them an annular indicating member 60 which as indicated in FIGURE 8 is mounted with a pointer 61 having a letter F on it indicating finish time and also marked with a red sector 62 the remainder 63 of the annulus being of contrasting colour marked with a legend MAN at 64 indicating manual control. This annular indicating member 60 thus rotates with the arbor and corresponds to the hour hand of the clock.

Figure 7:
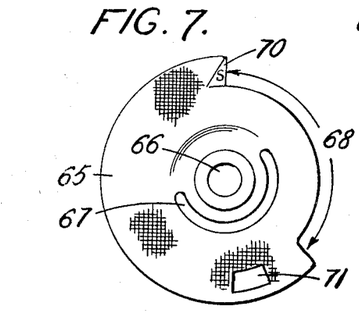
FIGURE 7 is a face view of the upper indicating member shown in FIGURE 6.

Resting on the upper face of the annular indicating member 60 is an indicating member 65 in the form of a disc shown in FIGURE 7 the diameter of which is about the same as the outer diameter of the aforesaid annulus 60 but having an arcuate cut-away portion 68 in its periphery so as to leave exposed to view a part of the annulus 60. The centre of the indicating disc is provided with a hole 66 which loosely encircles the sleeve and an arcuate slot 67 through which extends a pin 69 extending upwardly from the disc 46. The indicating disc at one end of the arcuate slot 68 is marked with a letter S at 70 indicating start time. The indicating disc is also provided with a window 71 which under certain conditions referred to later registers with the legend MAN on the indicating member 60. The sleeve 42 is encircled by a light helical spring 72, one end of which is fixed to the sleeve and the other end is fixed to the indicating disc 65.

Figure 6:
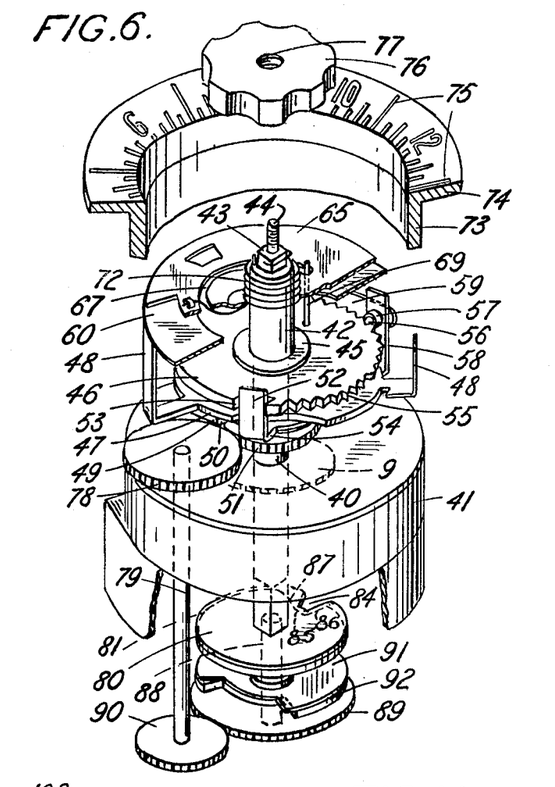
FIGURE 6 is a similar view to FIGURE 1 of an alternative arrangement.

The assemblage so far described is arranged within a casing 73 a part only of which is shown in FIGURE 6 and has an outwardly directed flange 74. The outer face of the flange is provided with a time scale 75. A transparent cover (not shown) is arranged over the scale and held to the flange 74 by a bezel. The transparent cover has a hole in the centre thereof through which the portion 43 of the sleeve extends and is received in a square socket in a manipulating knob 76 which is held on the square portion by a nut arranged in a hole 77 in the knob and engaging the threaded extremity 44.

The pinion 51 which is rotatable on the arbor and is coupled to the disc 46, engages a gear wheel 78 fixed to the upper end of the spindle 79 which extends through the hollow body part 41 so as to project below the lower side thereof. The arbor 40 also extends through the lower side of the body part 41 and drives a cam 80 through a lost motion disc 81 for which purpose one of these is provided with a pin 82 and the other with an arcuate slot 83 (as best seen from FIGURES 10 to 13).

The periphery of the cam 80 is provided with a comparatively narrow trapezium shaped slot 84 having radial sides and the lost motion disc 81 is provided with a slot 85 one side of which 86 is nearly radial and the other side 87 is inclined to a radius.

The lower extremity of the arbor 40 is reduced in diameter at 88 and there is rotatably mounted upon it a gear wheel 89 which engages a pinion 90 fixed to the lower end of the spindle 79. The gear wheel 89 drives a cam 91 through a lost motion disc 92 for which purpose these parts are provided with a pin 93 and a slot 94. The number of teeth of the gears 78, 90 and 89 are such that the ratio of transmission between the gear 89 and the gear 51 is less than one-to-one, i.e. a complete rotation of the gear 51 corresponds to less than a complete rotation of the gear 89, thus the cam 91 is driven at a lesser rate than the cam 80.

Refering now to FIGURES 10 to 13 the underside 95 of the hollow body 41 has fixed to it a pin 96 and pivotally mounted on the pin are two lever arms 97 and 98 which straddle the cam assemblage, the lever arm 97 is provided with a hole which closely encircles the pin 96 whereas the hole 99 in the arm 98 is elongated in shape so as to permit a certain degree of lateral movement of the arm. The arm 97 has fixed to it a cam follower 100 in the form of an axially extending pin which engages the periphery of the cam 80. Similarly the arm 98 is provided with a cam follower pin 101 which engages the periphery of the cam 91.

The ends of the levers 97 and 98 are provided respectively with abutment pieces 102 and 103. A tension spring 104 is connected between the extremity of the arm 97 and an anchorage pin 105 projecting from the underface 95 of the hollow body part 41. Another tension spring 130 is connected between a lug 106 projecting from one end of the slot 99 in the lever arm 98 and to an anchorage pin 107 on the underface 95. The abutment piece 103 at the extremity of the lever arm 98 is arranged opposite the end of a small plunger 108 constituting an actuating member for a ball valve 116 extending through a bearing 109 in a valve casing 110. The valve casing is formed with a valve chamber 112 from which extends two ports 113 and 114 leading to gas supply and delivery passages respectively (not shown). The port 113 is arranged in line with the plunger 108 and which port is provided with an enlargement terminating in a valve seat 115 on which may rest a ball valve 116. A small compression spring 117 is disposed between the ball 116 and the shoulder provided by the enlargement of the port 113.

Figure 9:
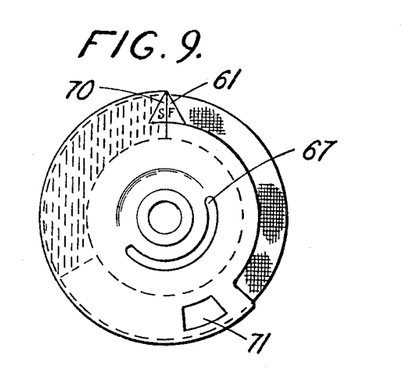
FIGURE 9 is a face view of the assembled indicating members.

As referred to earlier in the specification FIGURES 10 to 13 are views looking underneath the apparatus and FIGURES 7 to 9 illustrating the indicating disc are looking from above, thus clockwise rotation looking from above appears to be counter-clockwise looking from below.

Figure 10:
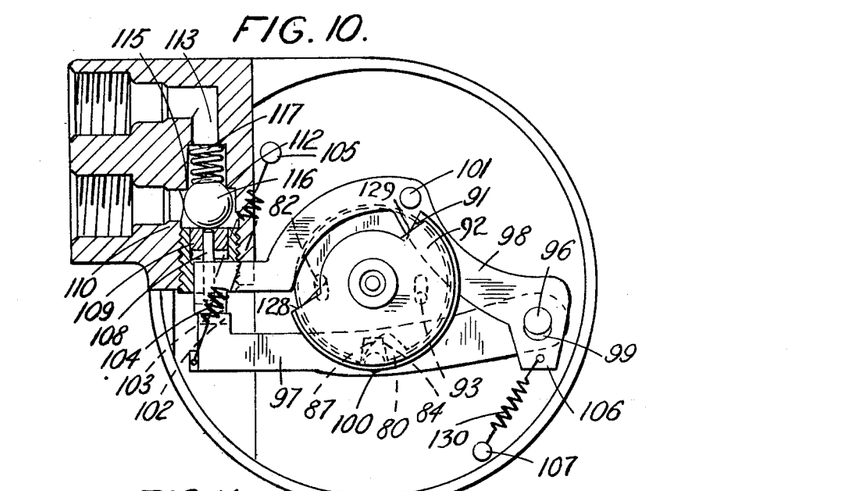
FIGURE 10 is a view looking from the underside of FIGURE 8 showing the position of the various parts when the setting mechanism is in the datum position.

When the parts are in a datum position as shown in FIGURES 9 and 10 the ball valve 116 is resting on its seat 115 and the follower 101 is opposite but not in the arcuate slot 128—129 of cam 91 whilst the follower 100 is in the slot 84 of cam 80. Under these conditions the spring 117 is not strong enough to overcome the action of the spring 104. The indicating pointers S, F are opposite the zero mark on the scale 75.

When it is desired to set the mechanism the manipulating knob 76 is rotated clockwise as viewed from above and this will result in the cams also being rotated clockwise. This initial movement of the arbor winds up the driving spring the slip clutch 132 coming into action in the transmission.

Figure 11:
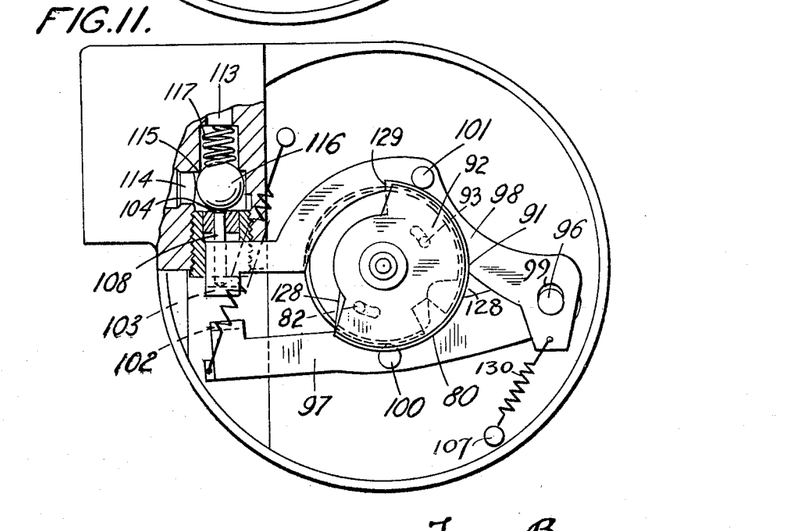
FIGURE 11 is a similar view to FIGURE 10 showing the position of the various parts after the mechanism has been initially set.

The pin 69 on the disc 46 will initially be at the right hand end of the arcuate slot 67 in the indicating disc 65. The rotation of the knob 76 clockwise will cause the sleeve 42, disc 46 and lug 52 also to be rotated clockwise and the radial portion of the lug 52 bearing against the radial abutment face 50 of the plate 47 will cause the arbor 40 also to rotate clockwise and it will cause the cam 80 to rotate in like manner and thus will appear counter-clockwise as shown in FIGURES 10 and 11. Likewise the gear 51 will be rotated clockwise as viewed from above and this will rotate the gear wheel 89 also clockwise which in its turn will rotate the cam 91 counter-clockwise as viewed from below at a slower rate than the cam 80. The lost motion between the lost motion disc 81 and cam 80 will cause the inclined face 87 of the slot in the lost motion disc to urge the follower 100 out of the slots 84 and 86 so that it rests on the circular portion of the cam 80, and similarly the follower 101 will have been moved opposite the circular portion on the cam 91. Thus the movement of the follower 100 on to the circular portion of the cam 80 brings the abutment 102 on the lever arm 97 away from the abutment 103 on the arm 98 and the abutment 103 will still be in the same position with relation to the plunger 108 since the follower 101 is on the circular portion of its cam 91. The effect of rotating the manipulating knob will have been to bring both pointers 70 and 61 opposite the finishing time. The manipulating knob is then rotated counter-clockwise looking from above leaving the finishing pointer 61 against the finishing time but the light spring 72 will cause the upper indicating disc 65 and its pointer 70 to follow up the manipulating member and the counter-clockwise rotation is continued until the pointer S is opposite the desired starting time.

During the counter-clockwise movement radial portion 54 of the lug 52 will move away from the radial abutment face 50 on the disc 46 and the teeth on the disc will ratchet over the ball 56 which is stationary. The gear wheel 51 to which the lug 52 is attached will rotate counter-clockwise and in rotating will rotate the gear wheel 89 and the cam 91 in an opposite direction to the previous movement namely clock-wise as viewed from below and will bring the cam 91 close to some such position as shown in FIGURE 11 with the follower 101 engaging the circular portion as previously indicated.

Figure 12:
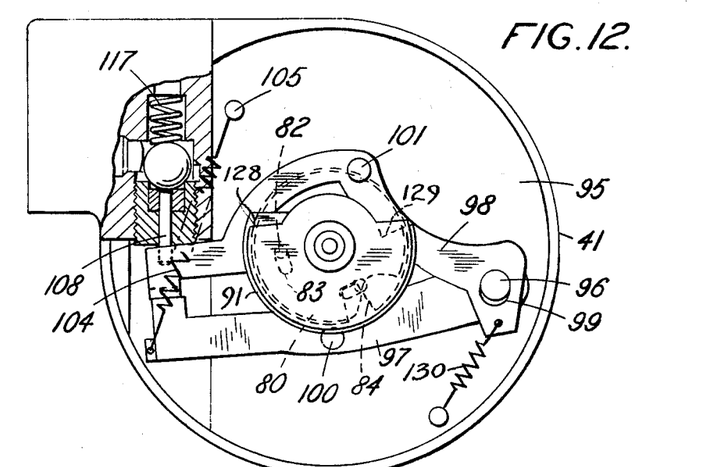
FIGURE 12 is a similar view to FIGURE 10 showing the position of the parts when the time has been reached for the gas valve to be opened.
Figure 13:
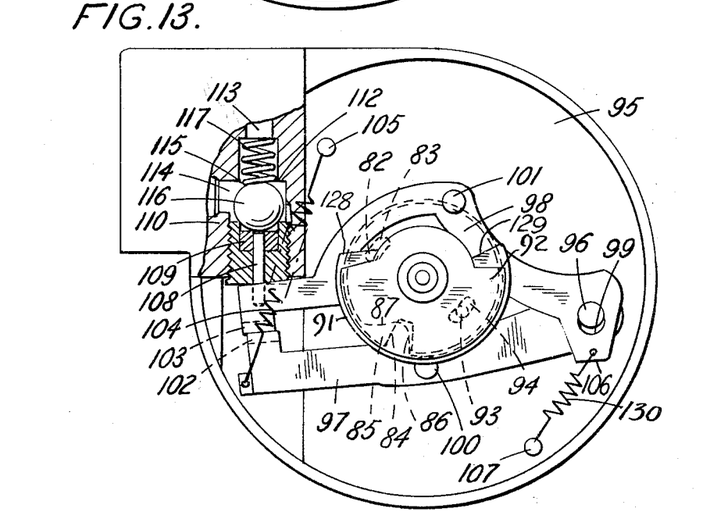
FIGURE 13 is a similar view to FIGURE 10 showing the position of the parts when the mechanism has been brought into a position in which the gas flow can be controlled by a separate thermostatically controlled valve or hand controlled valve.
Figure 14:
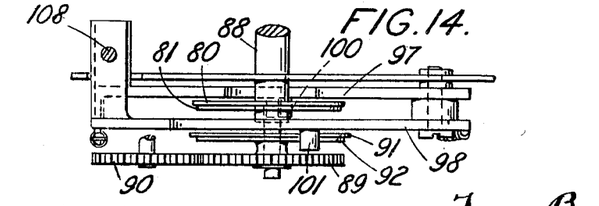
FIGURE 14 is a side elevation of the cam mechanism shown in FIGURES 10 to 13.

The rotation of both cams then comes under control of the clock driven arbor and will rotate the cams clockwise as viewed from below with respect to FIGURES 11 and 12 and when the start time is reached the arcuate slot 128—129 in the cam 91 and in the lost motion disc comes opposite the follower 101 which can then move slightly inwards as shown in FIGURE 12 allowing the plunger 108 to be retracted and the spring 117 then moves the ball off its seat and permits gas to flow through the valve. Under these conditions the abutments 102, 103 on the lever arms are in contact with one another as shown in FIGURE 12. Continued clockwise movement of the cam will cause the follower 100, when the finishing time is reached, to drop into the cut-away portion 84 in the cam 80 and the action of the spring 104 overcomes the spring 117 and the ball valve closes. The spring 130 allows for manufacturing tolerances and ensures the proper functioning of the cams and cam followers when the parts are in the positions shown in FIGURE 11. Considering, for example, the carrier 98, it will be seen that without the provision of the slot 99 and spring 130 there would be a danger that either the valve 116 would be closed too tightly (follower 101 being jammed against its cam) or of the valve not being completely closed. The spring 130 will require to exert a greater force than the valve spring 117.

Assuming it is desired to control the gas valve by hand, the manipulating knob is rotated counter-clockwise from the datum position so that the lost motion is taken up fully between the cams when the follower 101 is adjacent the end 128 of the slot. However, for convenience, in FIGURE 13 the parts are shown in different positions where the follower 100 is on the circular portion of its cam whereas the follower 101 is opposite the arcuate slot of its cam midway between the ends 128, 129. Under either of these conditions the spring 117 can move the ball away from the valve seat and the gas can be controlled by usual thermostat and other valves associated with the burner.

In rotating the manipulating member counter-clockwise the pin 69 will come to the upper end of the slot 67 in the disc 65 as viewed in FIGURE 9 and bring the window 71 opposite the legend MAN on the indicating annulus 60.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A control mechanism comprising first and second cams and cam follower means mounted to be positioned by the cams, the cams having datum positions, constant speed driving means connected to the cams, said cams having a single setting member by means of which the cams may be set away from their datum positions to differing extents, the constant speed driving means driving the cams back to their datum positions from their set positions, an actuating member operated by the cam follower means and movable thereby between first and second positions, means for determining the position of the actuating member solely by the positions of the cams, the actuating member being in its first position when one only of the cams is in its datum position, and being in its second position for all other positions of the cams.

2. A control mechanism comprising first and second cams and cam follower means constructed to be positioned by the cams, the cams having datum positions, said cams having constant speed driving means connected thereto, said cams having a single setting member by means of which the cams may be set away from their datum positions in either of two senses to differing extents, the constant speed driving means driving the cams back to their datum positions only when they are set away from the datum positions in one sense, an actuating member operated by the cam follower means and movable thereby between first and second positions, means for determining the position of the actuating member solely by the positions of the cams, the actuating member being in its first position when one only of the cams is in its datum position, and being in its second position for all other positions of the cams.

3. A control mechanism for moving a single actuating member at pre-selected times from one limit of movement to another comprising a first spring connected to apply a force to the actuating member, first and second cams, a clockwork transmission connected to drive said cams and embodying a lost motion device providing relative rotational adjustment between the cams, both said cams having cut-outs in their operative faces, first and second cam followers engageable by the cams and mounted on carriers which are separate from the single actuating member and having opposed parts, a second spring connected to exert a force on said opposed parts to bring said opposed parts into engagement with one another when the followers are opposite said cut-outs (under datum conditions), said springs being connected to maintain said cam followers in engagement with their cams and the carrier of one follower in engagement with the actuating member to place it in a first position when the follower is in the cut-out of its associated cam and place it in a second position when the follower is not in the cut-out, said springs being connected to exert a force on the carrier of the first follower to move it out of the cut-out of its associated cam when both followers lie opposite the cut-outs of their associated cams.

4. A control mechanism according to claim 3, means for driving a manual setting member, said setting member having means connected thereto placing one of the cams under direct control of said setting member and means connecting the other cam direct to the constant speed driving means.

5. A control mechanism according to claim 3, in which the said second spring is connected between the carriers and urges the followers toward their cams and the said first spring operates upon the said actuating member in opposition to the said second spring, said mechanism mounting said cams, said followers and said springs so that they co-operate to control movement of said actuating member from one said limit of movement to another, and said second spring forces the follower of said second cam into the cutout of said second cam when both followers are opposite the said cutouts in their respective cams, leaving said first follower at least in part outside the cutout in said first cam and thereby locating said actuating member at one said limit of its movement, said actuating member being postioned at said other limit of its movement when said second follower is not opposite said cutout in said second cam and said first follower is forced by spring action into the cutout of said first cam.

6. A control mechanism according to claim 5 said cam followers each having a part moving therewith, said part moving with the second follower engages the part moving with the first follower when the second follower enters the cut-out in its associated cam whereby the first follower is moved out of the cut-out in its associated cam.

7. A control mechanism according to claim 3, a fixed anchorage mounted on said mechanism, said second spring connecting said anchorage and that one of said carriers not in engagement with said actuating member to urge said one of said carriers towards said carrier in engagement with said actuating means, said mechanism mounting said springs, said cams and said cam followers in co-operating relation to control movement of said actuating member from one said limit of movement to the other, said carriers acting to move said actuating means to one said limit in response to the force of said second spring when both said followers are opposite the cutouts of their respective cams, said carriers acting to move said actuating means to its opposite limit under the action of said first spring when said second follower is opposite the cutout of said second cam and said first follower is in a position other than opposite the cutout of said first cam.

8. A control mechanism according to claim 3 wherein the two cams are co-axially arranged and said cut-outs are formed in their peripheral faces.

9. A control mechanism according to claim 3 wherein one of the cams has a cut-out of an angular extent corresponding to that required for the maximum time during which the actuating member is required to be maintained at one limit of its movement.

10. A control mechanism according to claim 9 wherein one wall of the cut-out in the other of said cams is substantially radial whereby upon entry of the respective follower into it, under the action of said second spring, the rotation of the cams and clockwork is arrested.

11. A control mechanism according to claim 3 wherein the transmission for driving said cams is provided with gearing whereby the first cam rotates at a greater speed than the second cam.

12. A control mechanism according to claim 3, said two cams being co-axially mounted in said mechanism with said cam followers disposed on opposite sides of the two co-axially arranged cams and two lever arms pivoted together at a distance away from the axis of rotation of the cams with said cam followers each mounted on one of said arms so that the pivot axis lies in a plane extending substantially midway between the followers and containing the axes of said cams and the second spring being connected to urge one said arm towards the other.

13. A control mechanism according to claim 3, said mechanism having means for limiting the movement of the two carriers towards one another.

14. A control mechanism according to claim 3, said two carriers having faces positioned to abut one another thereby limiting their movement towards one another.

15. A control mechanism according to claim 3 wherein the said first spring means is incorporated in the mechanism to be controlled by the actuating member.

16. A control mechanism according to claim 3, a valve having a movable valve member for opening and closing said valve, said first spring being connected to exert a force on one side of said movable valve member and means connecting the opposite side of said movable valve member for actuation by said actuating member whereby said control mechanism is operative to open and closed said valve.

17. A control mechanism according to claim 3 wherein the transmission for driving the two cams comprises an arbor mounted for rotation in response to force exerted by said second spring, an escapement mechanism geared to said arbor, first and second pinions rotatably mounted on said arbor, said arbor having one of said cams mounted thereon in engagement with said first pinion, a rotatably adjustable coupling connecting said second pinion to said arbor, a lay spindle, fixed bearing means mounting said lay spindle for rotation, third and fourth pinions attached to said lay spindle and meshed with said first and said second pinions, respectively, whereby the operation of said spindle is controlled by said control mechanism.

18. A control mechanism according to claim 3 wherein the transmission for driving the two cams comprises an arbor mounted for rotation in response to force exerted by said second spring, an escapement mechanism geared to said arbor, first and second pinions rotatably mounted on said arbor, said arbor having one of said cams mounted thereon in engagement with said first pinion, a rotatably adjustable coupling connecting said second pinion to said arbor, a lay spindle, fixed bearing means mounting said lay spindle for rotation, third and fourth pinions attached to said lay spindle and meshed with said first and said second pinions, respectively, said gearing between said arbor and said escapement mechanism embodying a slip clutch, whereby the operation of said spindle is controlled by said control mechanism.

19. A control mechanism according to claim 3 wherein the transmission for driving the two cams comprises an arbor mounted for rotation in response to force exerted by said second spring, an escapement mechanism geared to said arbor, first and second pinions rotatably mounted on said arbor, said arbor having one of said cams mounted thereon in engagement with said first pinion, a rotatably adjustable coupling connecting said second pinion to said arbor, a lay spindle, fixed bearing means mounting said lay spindle for rotation, third and fourth pinions attached to said lay spindle and meshed with said first and said second pinions, respectively, said rotatably adjustable coupling comprising two coupling elements, the first of said two coupling elements being fixed to said arbor, the second of said two coupling elements yieldingly and rotatably engaging said first coupling element and being connected to the second pinion.

20. A control mechanism according to claim 3 wherein the transmission for driving the two cams comprises an arbor mounted for rotation in response to force exerted by said second spring, an escapement mechanism geared to said arbor, first and second pinions rotatably mounted on said arbor, said arbor having one of said cams mounted thereon in engagement with said first pinion, a rotatably adjustable coupling connecting said second pinion to said arbor, a lay spindle, fixed bearing means mounting said lay spindle for rotation, third and fourth pinions attached to said lay spindle and meshed with said first and said second pinions, respectively, said rotatably adjustable coupling comprising two coupling elements, the first of said two coupling elements being fixed to said arbor, the second of said two coupling elements yieldingly and rotatably engaging said first coupling element and being connected to the second pinion, said yieldingly rotatable engagement between said two coupling elements comprising a spring pressed ball carried by one of said coupling elements, the other of said two coupling elements having teeth formed on its periphery for engaging said ball.

21. A control mechanism according to claim 20, a manipulating member on said coupling element having teeth on its periphery, said toothed coupling element having a slot therein, a tongue means fixed on said second pinion to engage said slot in said toothed coupling element and to engage a part of the coupling element carrying said spring pressed ball when relative rotation is effected between said two coupling elements by means of said manipulating member.

22. A control mechanism according to claim 3, an arbor mounted for rotation in response to a force exerted by said second spring, a member rotatable about the axis of said arbor, a manipulating member having abutment means, a stationary part, two stops fixed respectively in relation to said manipulating member and said stationary part, an indicator comprising a circular time scale which is disposed around the axis of said arbor and is secured to a fixed part of the apparatus, a pointer fixed to the arbor and traversing said time scale, a second pointer on said member rotatable about the axis of the arbor and yieldingly connected to said manipulating member and provided with said abutment means engageable with said two stops fixed respectively in relation to the manipulating member and said stationary part, said abutment means and stops being so disposed that when the abutment means is in engagement with the stops on their trailing sides, with respect to the direction of rotation of the arbor under the action of said second spring, one of the followers is in engagement with the cut-out in the first cam at the leading end thereof and the other follower is in the cut-out in the second cam.

23. A control mechanism according to claim 3, an arbor, a member rotatable about the axis of said arbor and having an arcuate slot, a manipulating member mounted for rotation, a part rotating with said manipulating member and having a pin projecting through said slot, an indicating mechanism comprising a circular time scale which is disposed around the axis of rotation of said arbor and is secured to a fixed part of the apparatus, a pointer fixed to the arbor and traversing said time scale, a second pointer on said member rotatable about the axis of the arbor, said member carrying said second pointer being yieldingly connected to said manipulating member.

24. A control mechanism according to claim 3, an arbor, a member rotatable about the axis of said arbor and having an arcuate slot, a manipulating member mounted for rotation, a part rotating with said manipulating member and having a pin projecting through said slot, an indicating mechanism comprising a circular time scale which is disposed around the axis of rotation of said arbor and is secured to a fixed part of the apparatus, a pointer fixed to the arbor and traversing said time scale, a second pointer on said member rotatable about the axis of the arbor, said member carrying said second pointer being yieldingly connected to said manipulating member, and the yielding connection between the manipulating member and the first pointer comprises a helical spring tending to move the pointers apart.

25. A control mechanism according to claim 3, an arbor, a member rotatable about the axis of said arbor and having an arcuate slot, a manipulating member mounted for rotation, a part rotating with said manipulating member and having a pin projecting through said slot, an indicating mechanism comprising a circular time scale which is disposed around the axis of rotation of said arbor and is secured to a fixed part of the apparatus, a pointer fixed to the arbor and traversing said time scale, a second pointer on said member rotatable about the axis of the arbor, said member carrying said second pointer being yieldingly connected to said manipulating member, said yielding connection between the manipulating member and the first pointer comprising a helical spring tending to move the pointers apart, a first disc and a second disc, said second pointer being marked on said second disc at the leading end (with respect to the rotation of the arbor under the action of its spring) of an arcuate slot in the periphery of the disc and the first pointer is marked on said first disc so as to lie adjacent the second pointer when the followers are in their respective cut-outs before the mechanism is set.

26. A control mechanism according to claim 25, said first disc being differently colored on opposite sides of its pointer and the second disc is similarly colored to that part of the first disc which is on the leading side of its pointer.

27. A control mechanism according to claim 26 wherein the second disc is formed with a window beyond the trailing end of the arcuate slot on its periphery and the first disc is provided with a marking which appears in the window when the manipulating member is initially moved in a direction of rotation opposite to that for setting the time controlled mechanism.

References Cited in the file of this patent
UNITED STATES PATENTS

| | | |
|---|---|---|
| 719,390 | Stockall | Jan. 27, 1903 |
| 1,979,293 | Smith | Nov. 6, 1934 |
| 1,979,477 | Leland | Nov. 6, 1934 |
| 2,145,082 | Grayson | Jan. 24, 1939 |
| 2,166,683 | Grayson | July 18, 1939 |
| 2,444,146 | Schellens | June 29, 1948 |
| 2,662,595 | Neumann | Dec. 15, 1953 |
| 2,891,406 | Stoner | June 23, 1959 |